US011279400B1

(12) United States Patent
Eaton et al.

(10) Patent No.: US 11,279,400 B1
(45) Date of Patent: Mar. 22, 2022

(54) ADJUSTABLE WHEEL TRACK AXLE WITH INDEPENDENT WHEEL ANGLE CONTROL FOR AN AGRICULTURAL VEHICLE

(71) Applicant: RBR Enterprise, LLC, Byhalia, MS (US)

(72) Inventors: Jason Eaton, Byhalia, MS (US); Harry Glen Gaines, Byhalia, MS (US)

(73) Assignee: RBR Enterprise, LLC, Byhalia, MS (US)

( * ) Notice: Subject to any disclaimer, the term of this patent is extended or adjusted under 35 U.S.C. 154(b) by 639 days.

(21) Appl. No.: 16/238,101

(22) Filed: Jan. 2, 2019

Related U.S. Application Data

(60) Provisional application No. 62/612,861, filed on Jan. 2, 2018.

(51) Int. Cl.
*B62D 6/00* (2006.01)
*B60B 35/10* (2006.01)
*B60B 35/00* (2006.01)
*B62D 5/18* (2006.01)

(52) U.S. Cl.
CPC ............ *B62D 6/002* (2013.01); *B60B 35/003* (2013.01); *B60B 35/1054* (2013.01); *B62D 5/18* (2013.01)

(58) Field of Classification Search
CPC ...... B62D 6/002; B62D 5/18; B60B 35/1054; B60B 35/003
See application file for complete search history.

(56) References Cited

U.S. PATENT DOCUMENTS

| 2,317,139 A | 4/1943 | Morhiser |
| 4,736,811 A | 4/1988 | Marsden et al. |
| 4,778,023 A | 10/1988 | Sugasawa |

(Continued)

FOREIGN PATENT DOCUMENTS

| WO | WO-2005118379 A1 * | 12/2005 | ........... B60B 35/109 |
| WO | WO-2012084827 A1 * | 6/2012 | ............. B60B 35/12 |

OTHER PUBLICATIONS

Pillar & Braun, All-While System for Heavy Truck Applications SAE Technical Paper Series, from International Truck & Bus Meeting & Exposition Winston-Salem , North Caroline Nov. 13015 , 1995, (15 pages).

*Primary Examiner* — Hunter B Lonsberry
*Assistant Examiner* — Daniel L Greene
(74) *Attorney, Agent, or Firm* — Veritay Group IP PLLC; Susan Fentres; Liam O'Donnell (57) ABSTRACT

A system to simultaneously adjust a wheel track axle width and a steering angle of an agricultural vehicle made of: an at least two variable axle assemblies, each one of the variable axle assemblies connected to a wheel set of the agricultural vehicle is provided. During the wheel track axle adjustment process of a variable wheel track axle machine the angle of each wheel is "toed-in" or toed-our depending on wheel track extension or retraction. When the wheel track axle of the machine is being extended, all wheels are commanded to "toe-out" 3 degrees to aid in the extension and reduce external forces on the wheel and axle system. When the wheel track axle of the machine is being retracted, all wheels are commanded to "toe-out" 3 degrees to aid in the retraction and reduce external forces on the wheel and axle system. Once the wheel track axle adjustment is complete all wheels return to 0 degrees for normal operation.

8 Claims, 9 Drawing Sheets

(56) References Cited

U.S. PATENT DOCUMENTS

| | | |
|---|---|---|
| 4,828,071 A | 5/1989 | Gaede |
| 4,856,814 A | 8/1989 | Jones |
| 4,940,105 A | 7/1990 | Matsunaga et al. |
| 5,244,226 A | 9/1993 | Bergh |
| 5,273,129 A | 12/1993 | Wright et al. |
| 5,282,644 A | 2/1994 | Larson |
| 5,417,299 A | 5/1995 | Pillar et al. |
| 5,454,583 A | 10/1995 | Torborg |
| 5,464,243 A | 11/1995 | Maiwald et al. |
| 5,489,113 A | 2/1996 | Torborg |
| 5,524,079 A | 6/1996 | Ishida et al. |
| 5,557,154 A * | 9/1996 | Erhart .................. F04B 7/00 310/68 B |
| 5,597,172 A | 1/1997 | Maiwald et al. |
| 5,897,601 A | 4/1999 | Suzuki |
| 5,931,256 A | 8/1999 | Langkamp |
| 6,095,277 A | 8/2000 | Bohner et al. |
| 6,139,045 A | 10/2000 | Vandenbark et al. |
| 6,167,982 B1 | 1/2001 | Dillon |
| 6,345,674 B1 | 2/2002 | Easton |
| 6,357,315 B1 | 3/2002 | Smith et al. |
| 6,502,661 B1 | 1/2003 | Heitzer |
| 6,547,029 B2 | 4/2003 | Peppler et al. |
| 6,575,263 B2 | 6/2003 | Hjelsand et al. |
| 6,584,380 B1 | 6/2003 | Beck |
| 6,681,551 B1 | 1/2004 | Sheidler et al. |
| 6,834,261 B1 | 12/2004 | Andonian |
| 6,892,124 B2 | 5/2005 | Humpal et al. |
| 7,249,418 B2 | 7/2007 | Bartscht et al. |
| 7,527,117 B2 | 5/2009 | Strong |
| 7,686,124 B2 | 3/2010 | Hublart et al. |
| 7,729,830 B2 | 6/2010 | Tarasinski et al. |
| 7,780,197 B2 * | 8/2010 | White ................ B62D 49/0657 280/781 |
| 7,894,958 B2 | 2/2011 | Tate et al. |
| 7,967,101 B2 | 6/2011 | Buschena |
| 8,172,032 B2 | 5/2012 | Buschena |
| 8,527,125 B2 | 9/2013 | Tate et al. |
| 8,527,177 B2 | 9/2013 | Linda et al. |
| 8,660,754 B2 | 2/2014 | Kristensen et al. |
| 8,763,717 B2 | 7/2014 | Kovach et al. |
| 8,825,295 B2 | 9/2014 | Turner |
| 8,831,851 B2 | 9/2014 | Canuto et al. |
| 9,072,214 B2 | 7/2015 | Connors et al. |
| 9,086,699 B2 | 7/2015 | Pirotas |
| 9,145,165 B2 | 9/2015 | Yamakado et al. |
| 9,205,869 B2 | 12/2015 | Turner |
| 9,272,724 B2 | 3/2016 | Golomb |
| 9,352,782 B2 | 5/2016 | Tollefsrud et al. |
| 9,358,884 B2 | 6/2016 | Stares |
| 9,462,748 B2 | 10/2016 | Dollinger et al. |
| 9,550,527 B2 | 1/2017 | Brooks |
| 9,598,068 B2 | 3/2017 | Maeda et al. |
| 10,004,171 B2 * | 6/2018 | Ballu ................ B60B 35/1045 |
| 2009/0276122 A1 * | 11/2009 | Demong ................ B62D 13/04 701/41 |
| 2011/0053723 A1 * | 3/2011 | Erhart .................... F16H 25/20 475/1 |
| 2014/0292064 A1 * | 10/2014 | Hannukalnen ........ B60B 35/125 301/128 |
| 2016/0009135 A1 * | 1/2016 | Jong .................... B60B 35/109 280/5.52 |
| 2019/0191614 A1 * | 6/2019 | Hafvenstein ........ B60B 35/1063 |

\* cited by examiner

ADJUSTABLE WHEEL TRACK AXLE WITH INDEPENDENT WHEEL ANGLE CONTROL FOR AN AGRICULTURAL VEHICLE

RELATED APPLICATIONS

This application claims the benefit of U.S. provisional patent application No. 62/612,861 filed Jan. 2, 2018, hereby specifically incorporated by reference in its entirety.

STATEMENT REGARDING FEDERALLY SPONSORED RESEARCH OR DEVELOPMENT

None.

REFERENCE TO A "SEQUENCE LISTING", A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

None.

FIELD OF THE INVENTION

Agricultural machines, such as self-propelled sprayers and fertilizer spreaders, may have fixed wheel track axles or optional variable wheel track axles. In a fixed wheel track machine, the wheel track is determined by the overall width of the axle and the offset of the wheel. The axle is fixed and cannot extend or retract. In a variable wheel track machine, the wheel track can be adjusted to a finite wheel track limited by a minimum and maximum.

Variable wheel track offers a substantial advantage over fixed wheel track. In general, the spacing between crop rows is diverse depending on the type of crop, soil conditions, implements used to plant the crop, or planting practices of the farmer. The conditions explained limit the productivity of a fixed wheel track machine. The wheel track can be changed on a fixed wheel track; however, adjustments are labor intensive as the wheel offset must change or wheel spacers added. In the conditions described, a variable wheel track is advantageous as the wheel track can be conveniently adjusted from inside the operator cabin. The minimum and maximum limits of the variable axle are typically designed to accommodate all variants of crop spacing. Therefore, it is preferable for agricultural machines to have variable wheel track to efficiently adapt to the variations of crop row spacing. Current variable wheel track designs do have limitations. For example, when trying to adjust wheel track, especially on a high-friction surface, it is advised to operate the machine in a series of S-pattern maneuvers to assist the hydraulic cylinders in either extension or retraction. This process requires a large area to operate the machine. Additionally, a negative force is generated on the side of the machine that is turning in when extending, and the side of the machine turning out when retracting. This adds stress to the axle and wheel components and potentially leads to premature failure, and it is difficult to find large areas to complete a wheel track adjustment without disturbing crops. Also, this method of wheel track adjustment results in premature tire wear due to the uncharacteristic movement when pushing the tire away from the machine during extension or pulling the tire towards the machine when retracting. To have an agricultural vehicle with the advantages of a variable wheel track that could perform adjustments effortlessly and without the need for a large area would be a valuable technical advance in the industry.

SUMMARY OF THE INVENTION

The inventive subject matter includes: a system to simultaneously adjust a wheel track axle and a steering angle of an agricultural vehicle made of: an at least two variable wheel track axle assemblies, each one of the variable wheel track axle assemblies connected to a wheel set of the agricultural vehicle, wherein each of the variable wheel track axle assemblies is made of: an outer axle housing having disposed therein an outer axle shaft; an inner axle housing having disposed therein an inner axle shaft, wherein the inner axle housing is fixed to a center differential gear unit and the outer axle housing is fixed to a planetary gear wheel unit, wherein the outer axle housing slidably connects the inner axle housing by means of a track width control hydraulic cylinder connected between the center differential gear unit and the outer axle housing, the outer axle being splinedly connected to the inner axle, wherein the outer axle is configured to move axially within the inner axle spline to maintain wheel control: a hydraulic steering cylinder connected to the planetary gear wheel unit of each wheel to independently adjust the steering angle of a wheel in a wheel set; a linear position sensor configured to detect the position of a wheel in a wheel set; and a computer system made of a controller and microprocessor and a non-transitory computer-readable storage medium coupled to the microprocessor, wherein the non-transitory computer-readable storage medium is encoded with computer-readable instructions; wherein when the computer-readable instructions are executed, the microprocessor performs the respective functions, wherein the computer system is configured to input a desired set point; an input of the wheel position from the position sensor and a signal to the track width adjustment cylinders to control the length of the wheel track axle and an output signal to the hydraulic steering cylinder to independently adjust the steering angle of each wheel in a wheel set.

The inventive subject matter further includes: a method for varying wheel track axle in an agricultural vehicle in operation with independent wheel angle control including the steps of: adjusting the track width from about 114 to 144 inches of a wheel sets while the agricultural vehicle is moving: adjusting the wheel angle to extend outwardly up to 3 degrees when the track is extending outwardly; adjusting the wheel angle to extend inwardly up to 3 degrees when the track is extending inwardly; and adjusting the wheel angle to zero when the track is stationary.

BRIEF DESCRIPTION OF THE SEVERAL VIEWS OF THE DRAWING

The invention description refers to the accompanying drawings:

FIG. 1 is a side (1A) a front (1B) and a back (1C) view of an agricultural vehicle having a variable axle assembly configured to adjust the distance between wheels, and (1D) an exploded view of 1A.

DETAILED DESCRIPTION OF THE INVENTION

The present invention may be understood more readily by reference to the following detailed description of the invention. It is to be understood that this invention is not limited to the specific devices, methods, conditions or parameters described herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

These and other aspects, features and advantages of the invention will be understood with reference to the detailed description herein, and will be realized by means of the various elements and combinations particularly pointed out in the appended claims. It is to be understood that both the foregoing general description and the following detailed description of the invention are exemplary and explanatory of preferred embodiments of the inventions and are not restrictive of the invention as claimed. Unless defined otherwise, all technical and scientific terms used herein have the same meaning as commonly understood by one of ordinary skill in the art to which this invention belongs.

A system to simultaneously adjust the wheel track axle length and the steering angle of an agricultural vehicle is provided. The system is made of: an at least two variable wheel track axle assemblies, each one of the variable wheel track axle assemblies is connected to a wheel set of the agricultural vehicle. During the wheel track axle adjustment process, the angle of each wheel is "toed-in" or "toed-out" depending on wheel track axle extension or retraction. When the wheel track axle of the machine is being extended, all wheels are commanded to "toe-out" 3 degrees to aid in the extension and reduce external forces on the wheel and axle system. When the wheel track axle of the machine is being retracted, all wheels are commanded to "toe-out" 3 degrees to aid in the retraction and reduce external forces on the wheel and axle system. Once the wheel track axle adjustment is complete all wheels return to 0 degrees for normal operation.

Now referring to FIGS. 1A-1D and 2, an agricultural vehicle 100 is shown. An agricultural vehicle 100 such as self-propelled sprayers and fertilizer spreaders are wheeled vehicles mounted on a frame 11 having a cab 12 for an operator and a hopper or vessel 13 for the delivery of agricultural products. This agricultural vehicle 100 has at least two variable wheel track axle assemblies 10, each of the variable axle assemblies are connected to a set of wheels located at least in the front and in the rear of the agricultural vehicle 100. The set of wheels is made of a first wheel set 7 and a second wheel set 8 of the agricultural vehicle 100.

The agricultural vehicle 100 has at least two variable axle assemblies 10, each of the variable axle assemblies are connected to a set of wheels located at least in the front and in the rear of the agricultural vehicle 100 by a wheel end planetary 25. The variable wheel track axle assembly 10 is connected to the frame 11 by a mount pad 21. In one embodiment, the variable wheel track axle assembly 10 has spring centers (not shown) and pad width to vehicle requirements.

Each of the at least two variable wheel track axle assemblies 10 are mechanically-driven steerable axles that are configured to adjust to varying row crops in five different wheel track axle widths: 114 in, 120 in, 132 in, 138 in, and 144 in. This width can vary by about 10 percent. In this agricultural vehicle 100, the wheel track axle width is variable in the range from about 114 to 144 inches, all while maintaining a constant load rating of 32,000 lbs per axle. Wheel track axle width is defined as follows: if A and B are two respective points thus defined for the wheels on the same axle of the tractor, then the wheel track width is the distance between points. Each axle can be adjusted independently or in unison and move in or out perpendicularly to the line of movement of the agricultural vehicle 100.

Now referring to FIGS. 2, 3, 4A-4E, the major axle assemblies of the variable wheel track axle assembly 10 include a center differential gear unit 26, left and right mount pads 21, left and right fixed inner axle housing 22, left and right outer axle housing 23, left and right inner axle shaft 27, left and right outer axle shaft 28, left and right outer axle housing bearing pad 24, left and right inner axle connection 33 with differential gear unit 26, left and right steering cylinder 48, left and right track width adjustment cylinder 49, kingpin pivot 20, and wheel end planetary 25. A track width adjustment cylinder 49 is used to control the track width. A center differential gear unit 26 connects to a first variable wheel track axle assembly 10 (left side) and a second variable wheel track axle assembly 10 (right side), each being a mirror image of the other side. A fixed inner axle housing 22 contains an inner axle shaft 27 which is connected to the center differential gear unit 26 at connection point 33. Each of the track width adjustment cylinders 49 are connected to the center differential gear unit 26. Each of variable wheel track axle assembly 10 is mechanically driven. The drive components include: a two-piece splined axle shaft 51 connected to a center differential gear unit 26 and a planetary wheel end 25 that allows the adjustment for each wheel end planetary 25 while maintaining engagement with the drive components (not shown).

Figure 2:
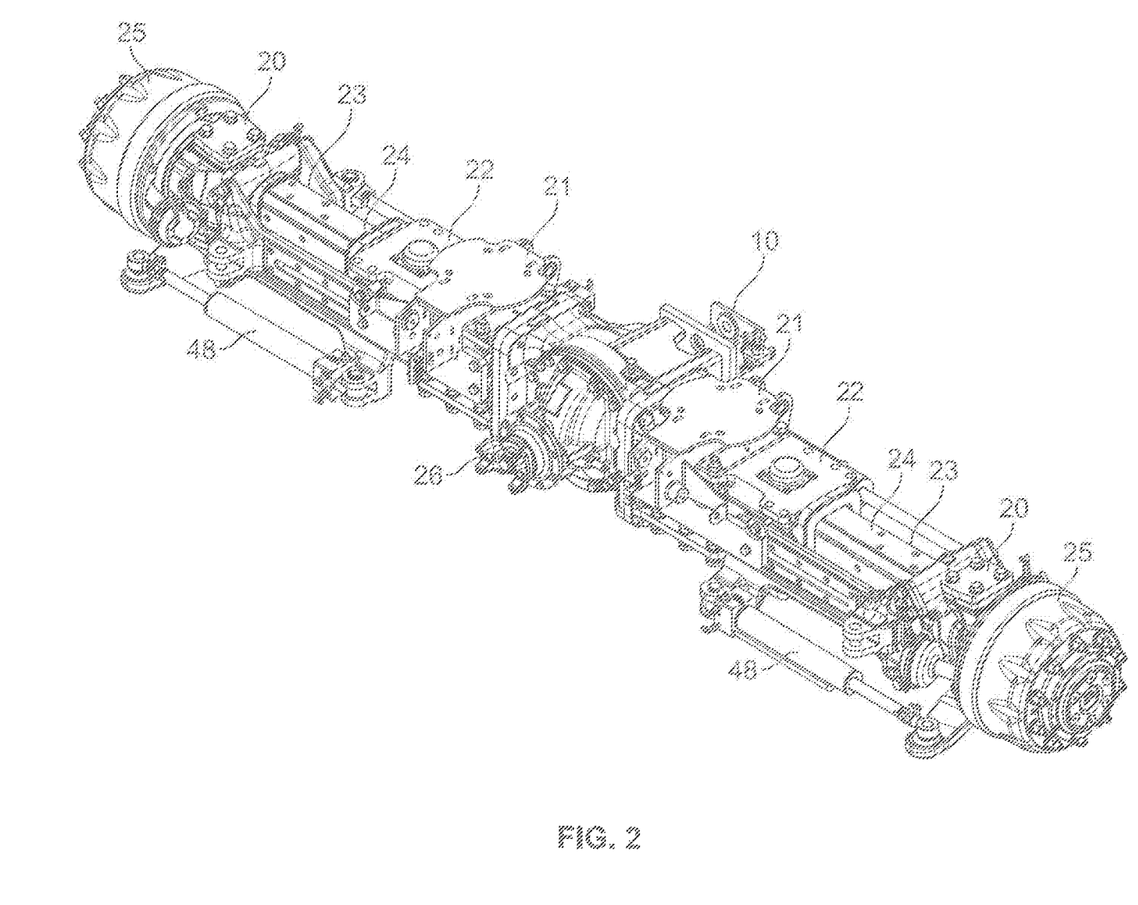
FIG. 2 is a perspective view of a variable wheel track axle assembly.
Figure 3:
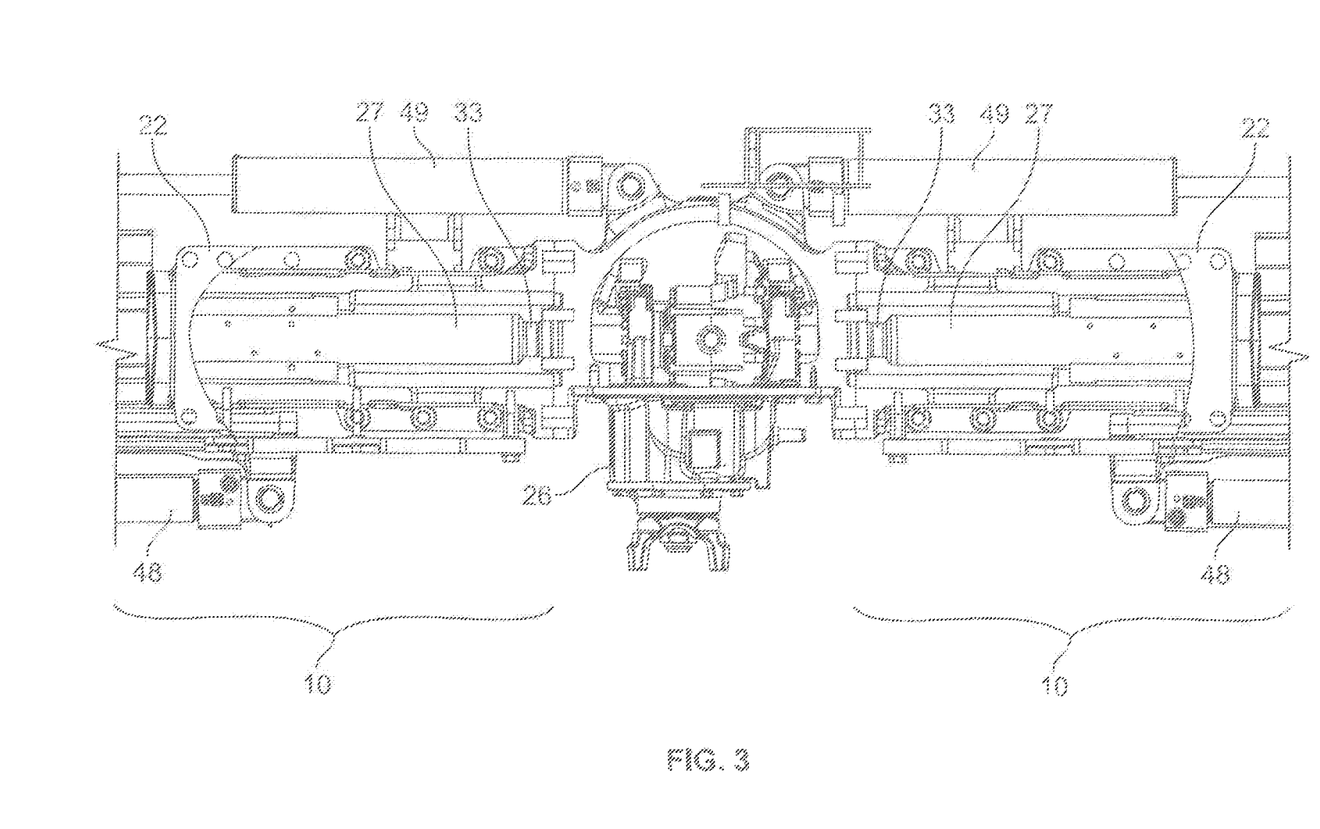
FIG. 3 is a perspective view of a portion of the variable track axle assembly.
Figure 4A:
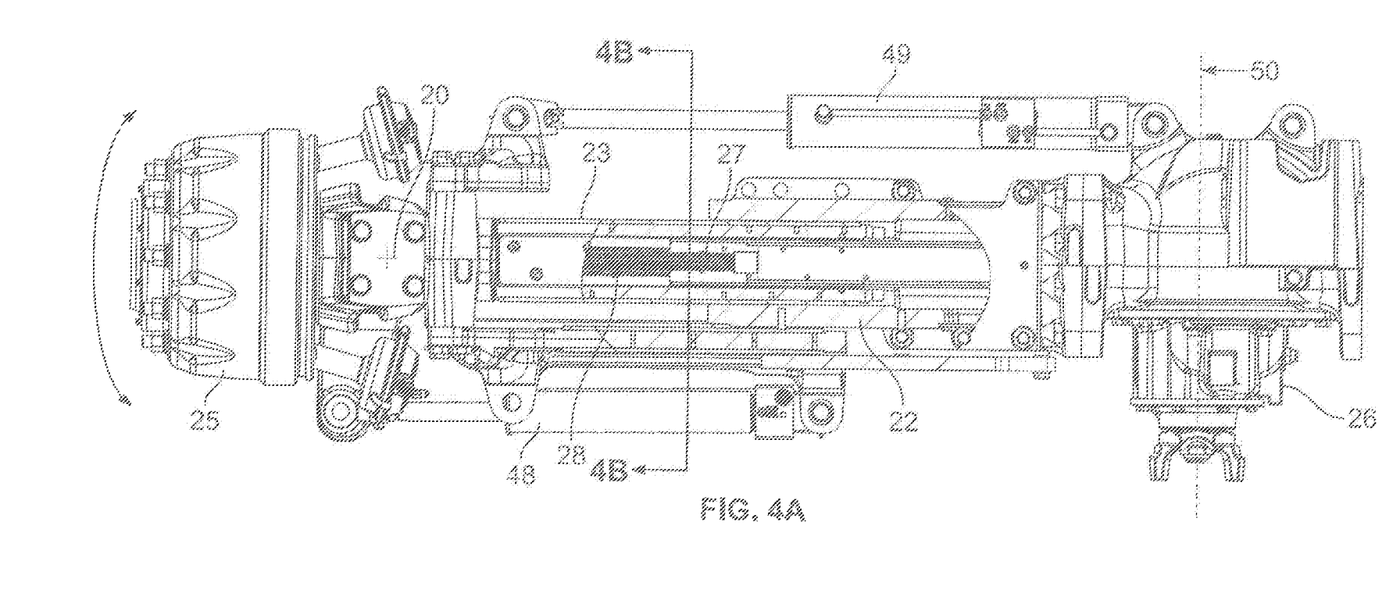
FIG. 4A is a top view of the variable track axle assembly showing the splined axle shaft assembly and 4B is a sectional view of the spline on the axle shaft.

Adjustment of track width is made with track width adjustment cylinders 49 which move the outer axle housings 23 either inward, with respect to the fixed inner axle housing 22, toward the vehicle centerline 50 or away from the centerline 50. An increase of track width is caused by the outer axle housings 23 to be moved laterally outboard with respect to the inner axle housings 22 by action of the track width adjustment cylinders 49 extending in length. A decrease of track width is caused by action of track width adjustment cylinders 49 shortening in length. Since both fixed inner axle housings 22 are both anchored to center differential gear unit 26, they are effectively rigidly tied together.

Figure 4B:
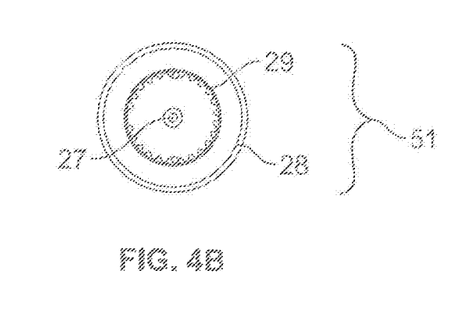

During an adjustment in track width, steering cylinders 48 lengthen or shorten concomitantly with track width adjustment cylinders 49, actuating by means of the control system to maintain steering direction and toe-in/toe-out wheel geometry. The inner axle shaft 27 is connected to center differential gear unit 26 at connection point 33, which fixes its lateral position. Outer axle shafts 28 are splinedly connected to inner axle shaft 27 to allow lateral movement of outer axle shafts 28 during track width adjustments. As shown in FIG. 48, the inner axle shaft 27 contains a splined connection 29 with outer axle shaft 28 to allow for track width adjustment. A first variable wheel track axle assembly 10 is configured to be coupled to a first wheel 7 of the agricultural vehicle 100. The first variable wheel track axle assembly 10 is made of a movable outer axle housing 23 having an outer axle shaft 28 and a fixed inner axle housing 22 having an inner axle shaft 27. The inner axle shaft 27 is connected at 33 to the center differential gear unit 26 on each side of the variable wheel track axle assembly 10. In one exemplary embodiment, a smaller sliding tube with a rectangular cross section inside a larger fixed tube with a similar cross section is provided. Between the tubes are housing bearing pad 24 such as low friction pads that serve as a bearing surface to allow the tubes to slide with very low resistance.

Now referring to FIGS. 4A and 4B, in addition to controlling the track width, the angle of the wheels is coordinated to reduce the need for a large area to make axle adjustments while in operation. Each wheel end planetary 25 is connected to a steering cylinder 48 to control the direction of wheel 7,8 travel. The steering cylinder 48 is connected to the wheel end planetary 25 and facilitates movement of the wheel from the kingpin pivot 20, which pivots around the center line plus or minus about 3 degrees. The inner axle shaft 27 of the fixed inner axle housing 22 mounts to steering cylinders 48.

Figure 1:
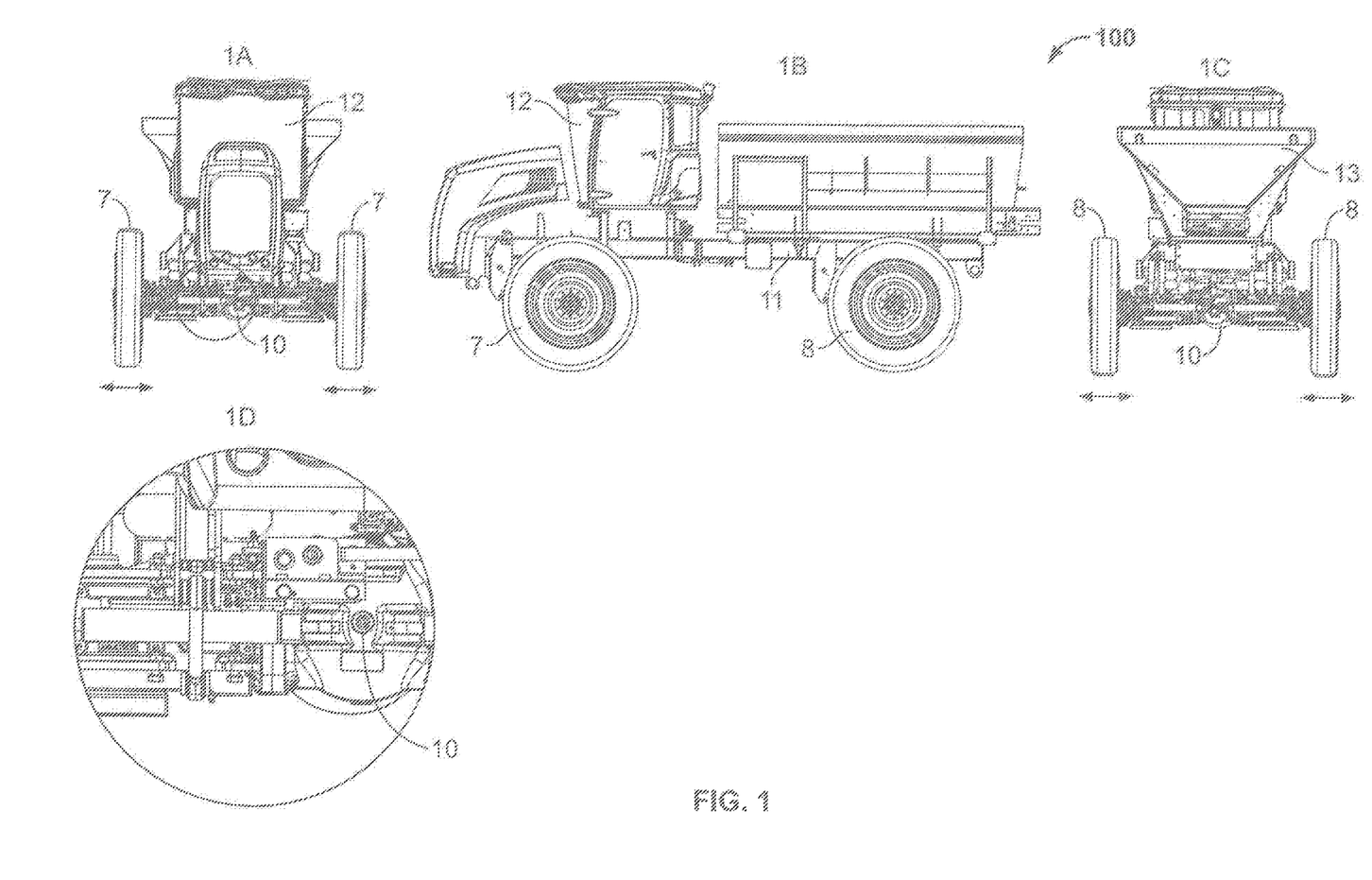
Figure 5:
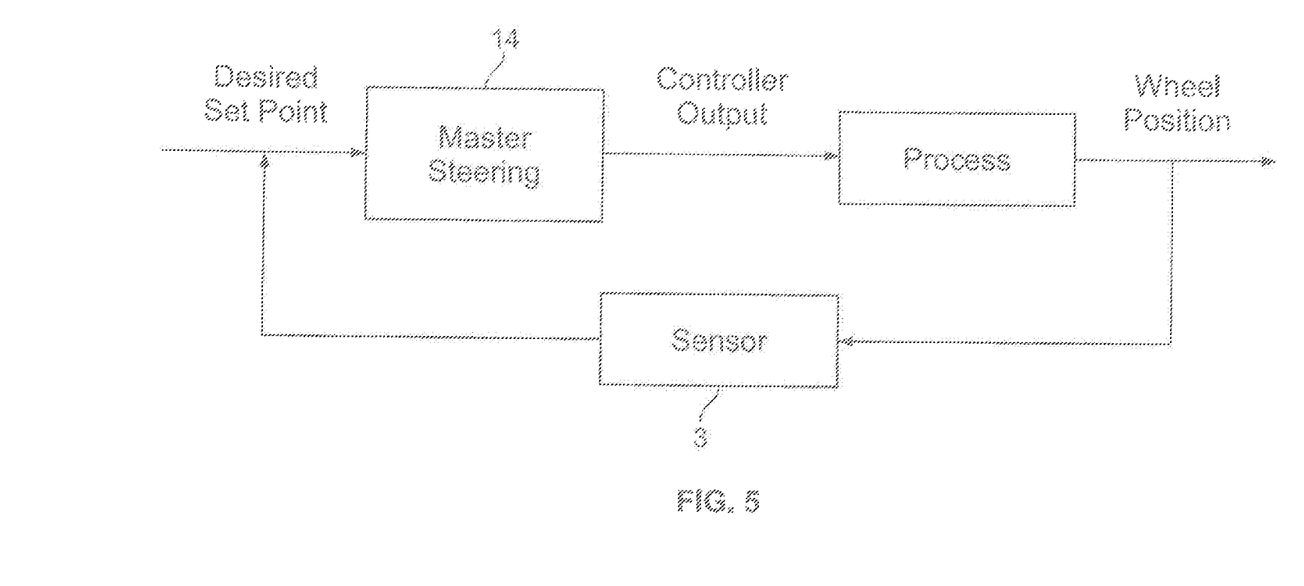
FIG. 5 shows a schematic diagram of a PID Control Loop.
Figure 6:
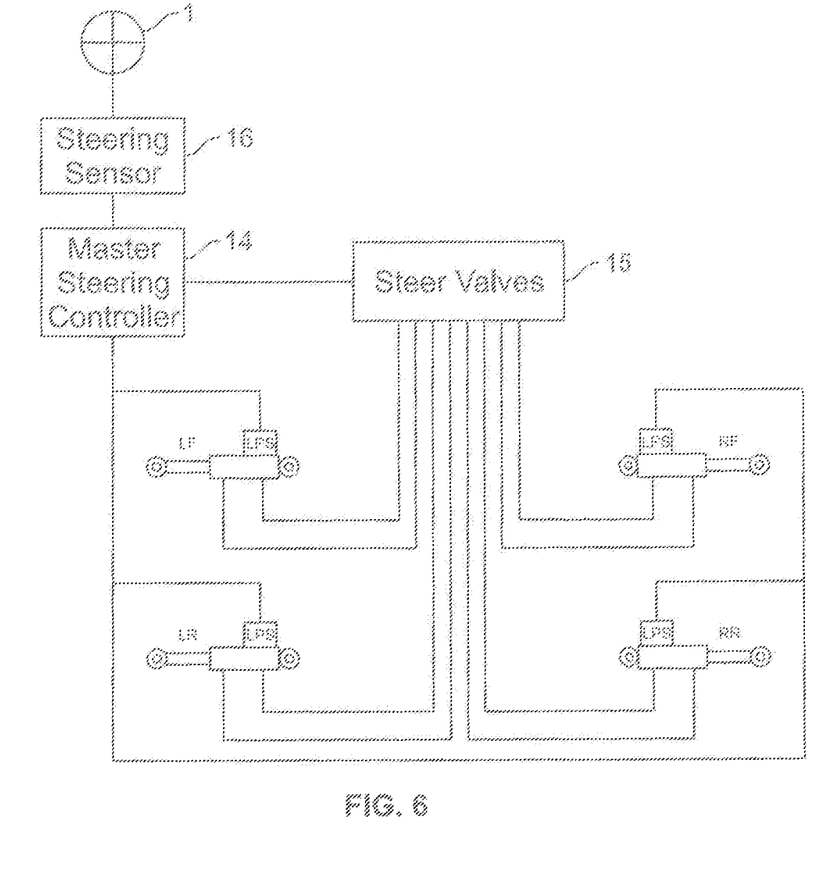
FIG. 6 shows a schematic diagram of a steer control circuit.

Now referring to FIGS. 1 & 5-6, the process for performing an axle adjustment takes into account actual wheel position and drives a hydraulic steering valve 15 to move wheels 7,8 to the desired position by using a PID control loop. In one embodiment, the computer system further includes a microprocessor and a non-transitory computer-readable storage medium coupled to the microprocessor, wherein the non-transitory computer-readable storage medium is encoded with computer-readable instructions that implement functionalities of the modules mentioned above so that when the computer-readable instructions are executed, the microprocessor performs the respective functions accordingly.

The master steering controller 4 receives a command from the operator via the HMI by pressing the desired axle width (desired set point), the master steering controller 4 monitors the position of the wheels 7,8 through a position sensor 3 located on each track width adjustment cylinder 49 (actual set point). The steering input device 16, such as a steering sensor interacts with the master steering controller 14, which sends a current (mA) output to drive the proportional hydraulic valve 15 using a PID control loop. The master steering controller 14 looks at actual set point vs. desired set point and uses the PID loop to minimize error over time by adjusting the current output (signal) to open the proportional hydraulic valve 15 so that the desired set point equals the requested set point.

Figure 7A:
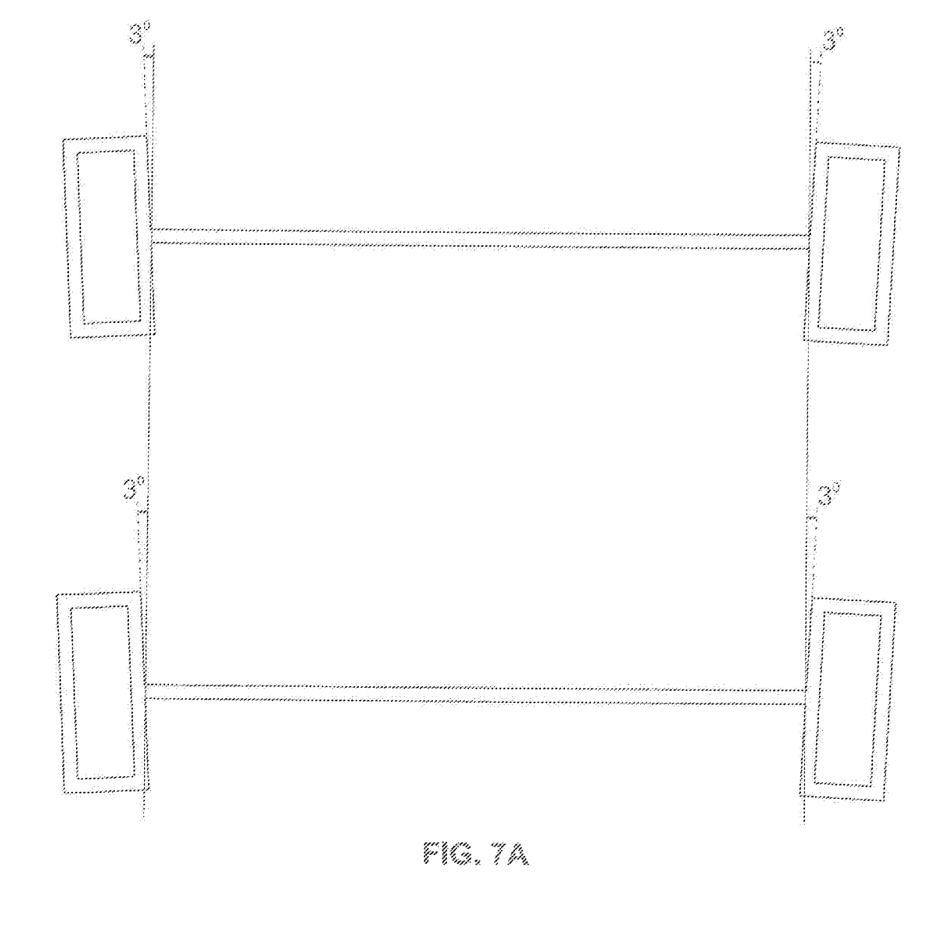
FIG. 7A shows a schematic diagram of the "toe out" axle extended sequence.
Figure 7B:
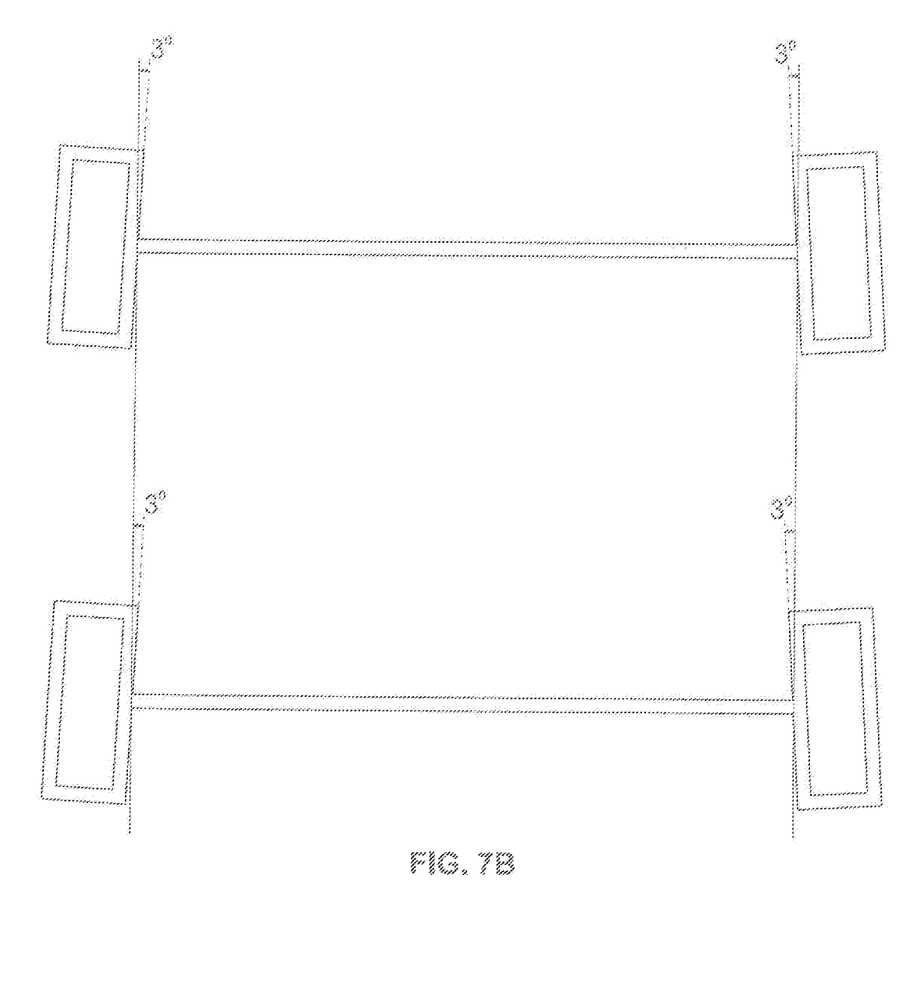
FIG. 7B shows a schematic diagram of the "toe in" axle retracted sequence.

Now referring to FIGS. 7A and 7B, during the wheel track axle adjustment process of a variable wheel track axle apparatus, the angle of each wheel 7,8 is "toed-in" or "toed-out", depending on wheel track axle extension or retraction. The steering angle is defined as the angle between the front of the vehicle and the steering wheel direction as shown in FIGS. 7A and 78.

Now referring to FIG. 7A, when the wheel track axle of the agricultural vehicle 100 is being extended, all wheels 7,8 are commanded to "toe-out" 3 degrees to aid in the extension and reduce external forces on the wheel 7,8 and variable wheel track axle apparatus. Now referring to FIG. 78, when the wheel track axle of the agricultural vehicle 100 is being retracted, all wheels 7,8 are commanded to "toe-in" 3 degrees to aid in the retraction and reduce external forces on the wheel and axle system. Once the wheel track axle adjustment is complete all wheels 7,8 return to 0 degrees for normal operation. The algorithm for performing an axle adjustment takes into account actual wheel position and drives a hydraulic valve 15 to move the wheel 7 to the desired position by using a PID control loop. The master steering controller 14 then sends a current (mA) output to drive the proportional hydraulic valve using a PID control loop.

The master steering controller 14 looks at actual set point vs. desired set point and uses the PID loop to minimize error over time by adjusting the current output to open the proportional hydraulic valve 15 so that the desired set point equals the requested set point. To have an agricultural vehicle 100 with the advantages of a variable wheel track that could perform adjustments effortlessly and without the need for a large area would be valuable. To do so, an individual wheel angle has been provided that automatically "toes-in" or "toes-out" each wheel in unison to assist the hydraulic steering cylinder 48 during the wheel track axle adjustment process.

Figure 8:
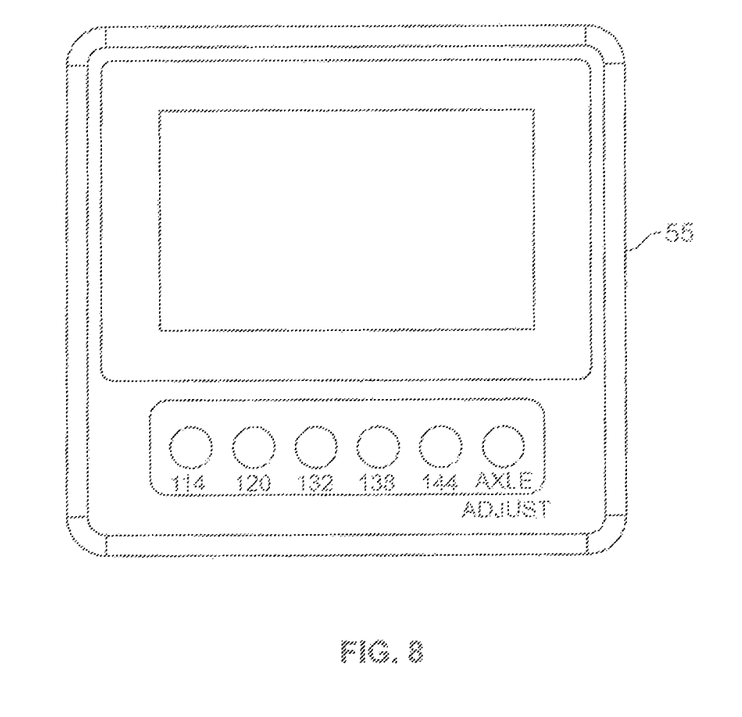
FIG. 8 shows an exemplary rendition of a user interface.

Now referring to FIG. 8, the operator selects the axle adjust button located on the key pad inside the cab. Once the adjust command is active and a wheel track axle position is selected, it will enable the PID controls for the axle adjustment valve 15 to adjust the hydraulic steering cylinders 48 accordingly to move the wheels 7 in or out depending on requested track width. The adjustment process has a set of predefined parameters that must be met before an adjustment sequence is initiated. First, the vehicle must be in low gear. Second, the speed of the vehicle is between 2-4 MPH. Third, the maximum vehicle RPM of the engine during the adjustment process is limited to 1000 RPM by the control system using the intermediated speed control command over J1939. If a two-wheel steering mode is selected, then the axle will not adjust if coordinated or crab modes are also selected. Four-wheel steering allows for increased maneuverability at the end of a pass. Crab steering allows for greater control when operating on hillsides.

The user selects from 1 of 5 preset axle widths from a keypad inside the cab. Axle width/adjustment applies to both front and rear axle to match the selected width. Axle width equals the total track width for the vehicle, which is the sum of the position of the axle adjust cylinder stroke length (measured by the linear position sensor) and the fixed axle width. If selection is different than existing axle width selection, then the following happens: PID controls for all 4 axle cylinders activate to calculate a percent valve output to move the track width adjustment cylinder 49 proportionally. Feedback for the control loop comes from position sensor 3 mounted inside each of the hydraulic steering cylinders 48 to measure extension distance of each cylinder. Once the feedback distance equals the target distance the command and movement stop. The PID commands a higher percent valve output (higher speed/flow) the further the target distance is from the feedback distance of the transducer. As the cylinder moves closer to the target distance, the percent valve output of the PID control proportionally reduces (slower speed/flow) until the target distance is achieved stopping the PID command to the valve and movement of the hydraulic cylinder.

During axle extension all four wheels are steered three degrees outward from the commanded steering position to aid extension and reduce external forces on the wheel/axle during extension. During axle retraction all four wheels are steered three degrees inward from the commanded steering position to aid retraction and reduce external forces on the wheel/axle during retraction. Once the axle adjustment is complete and the wheels are at the requested track width a message will pop up on the display 55 stating track width adjustment successful. If the wheels are not at the requested track a message will pop up stating track width unsuccessful and to repeat the adjustment procedure. The variable wheel track axle of this system could perform adjustments effortlessly and within a limited area. The agricultural spreader also features 4-wheel steering, allowing for tight turns in the field.

While the invention has been described with reference to preferred and example embodiments, it will be understood by those skilled in the art that a variety of modifications, additions and deletions are within the scope of the invention, as defined by the following claims.

The invention claimed is:

1. A system to adjust a wheel track axle width and a steering angle of an agricultural vehicle comprising:
    an at least two variable wheel track axle assemblies each of the variable wheel track axle assemblies connected to a wheel set of the agricultural vehicle, wherein the at least two variable wheel track axle assemblies comprise a front and a rear assembly, wherein each of the variable wheel track axle assemblies comprise:
    an outer axle housing having disposed therein an outer axle shaft;
    an inner axle housing having disposed therein an inner axle shaft, wherein the inner axle housing is fixed to a center differential gear unit and the outer axle housing is fixed to a planetary gear wheel unit, wherein the outer axle housing slidably connects the inner axle housing by means of a track width control, said a track width control comprising: a hydraulic cylinder connected between the center differential gear unit and the outer axle housing, the outer axle being splinedly connected to the inner axle, wherein the outer axle is configured to move axially within the inner axle spline to maintain wheel control;
    a hydraulic steering cylinder connected to the planetary gear wheel unit of each wheel to independently adjust the steering angle of the wheel in the wheel set;
    a linear position sensor configured to detect the position of the wheel in the wheel set;
    a computer system comprising a controller and microprocessor and a non-transitory computer-readable storage medium coupled to the microprocessor, wherein the non-transitory computer-readable storage medium is encoded with computer-readable instructions; wherein when the computer-readable instructions are executed, the microprocessor performs the respective functions, wherein the computer system is configured to input a desired set point; an input of the wheel position from the position sensor and an output signal to the track width adjustment cylinders to control the width of the wheel track axle and an output signal to the hydraulic steering cylinder to independently adjust the steering angle of the each wheel in the wheel set.

2. The system of claim 1 wherein the wheel track axle of the agricultural vehicle is being extended, the output to the hydraulic steering cylinder commands all wheels to "toe-out" to aid in the extension.

3. The system of claim 1 wherein the wheel track axle of the agricultural vehicle is being retracted, the output to the hydraulic steering cylinder commands all wheels to "toe-in" to aid in retraction.

4. The system of claim 1 further comprising a key pad inside the cab of the agricultural vehicle to input a selection of track width from about 114 to 144 inches of a wheel sets.

5. The system of claim 1 wherein the wheel end planetary is connected to a kingpin pivot, the kingpin pivot configured to pivot around the center line and the kingpin pivot is connected to the hydraulic steering cylinder.

6. The system of claim 5 wherein the wheel track axle of the agricultural vehicle is fixed, the output to a steering cylinder commands wheels to return to 0 degrees from the kingpin center line.

7. A method for adjusting a wheel track axle width and a steering angle of an agricultural vehicle comprising the steps of: comprising:
    providing an at least two variable wheel track axle assemblies each of the variable wheel track axle assemblies connected to a wheel set of the agricultural vehicle, wherein the at least two variable wheel track axle assemblies comprise a front and a rear assembly,
    wherein each of the variable wheel track axle assemblies comprise:
    an outer axle housing having disposed therein an outer axle shaft;
    an inner axle housing having disposed therein an inner axle shaft, wherein the inner axle housing is fixed to a center differential gear unit and the outer axle housing is fixed to a planetary gear wheel unit, wherein the outer axle housing slidably connects the inner axle housing by means of a track width control, said a track width control comprising: a hydraulic cylinder connected between the center differential gear unit and the outer axle housing, the outer axle being splinedly connected to the inner axle, wherein the outer axle is configured to move axially within the inner axle spline to maintain wheel control;
    a hydraulic steering cylinder connected to the planetary gear wheel unit of each wheel to independently adjust the steering angle of the wheel in the wheel set;
    a linear position sensor configured to detect the position of the wheel in the wheel set;
    a computer system comprising a controller and microprocessor and a non-transitory computer-readable storage medium coupled to the microprocessor, wherein the non-transitory computer-readable storage medium is encoded with computer-readable instructions: wherein when the computer-readable instructions are executed, the microprocessor performs the respective functions, wherein the computer system is configured to input a desired set point: an input of the wheel position from the position sensor and an output signal to the track width adjustment cylinders to control the width of the wheel track axle and an output signal to the hydraulic steering cylinder to independently adjust the steering angle of the each wheel in the wheel set, adjusting the wheel track axle width from about 114 to 144 Inches of a wheel set while the agricultural vehicle is moving;

adjusting the wheel angle to extend outwardly up to 3 degrees when the wheel track axle is extending outwardly;

adjusting the wheel angle to extend inwardly up to 3 degrees when the wheel track axle is extending inwardly; and adjusting the wheel angle to zero when the wheel track axle is stationary.

8. The method of claim 7 wherein the step of adjusting the wheel track width of an agricultural vehicle in operation comprises:

outputting a signal to the hydraulic steering cylinder to independently adjust the steering angle of each wheel in the wheel set.

\* \* \* \* \*